United States Patent [19]
Aoki et al.

[11] Patent Number: 5,131,367
[45] Date of Patent: Jul. 21, 1992

[54] METHOD FOR CONTROLLING IGNITION TIMING OF INTERNAL COMBUSTION ENGINE AND APPARATUS THEREFOR

[75] Inventors: Narutoshi Aoki, Mishima; Tetsuya Kondou, Shizuoka; Tomoyuki Ogawa, Numazu; Hiroyasu Nitou, Fuji; Kazuo Watanabe, Mishima; Yasuo Sasaki, Numazu, all of Japan

[73] Assignee: Kokusan Denki Co., Ltd., Numazu, Japan

[21] Appl. No.: 733,699

[22] Filed: Jul. 22, 1991

[51] Int. Cl.⁵ .............................................. F02P 5/15
[52] U.S. Cl. ..................................... 123/416; 123/418
[58] Field of Search ............... 123/416, 417, 418, 414, 123/419; 364/431.04, 431.07

[56] References Cited

U.S. PATENT DOCUMENTS

| | | | |
|---|---|---|---|
| 4,036,190 | 7/1977 | Bigliani et al. | 123/416 |
| 4,265,211 | 5/1981 | Meloeny | 123/643 |
| 4,562,812 | 1/1986 | Chaurel | 123/418 X |
| 4,711,226 | 12/1987 | Neuhalfen et al. | 123/609 |
| 4,747,383 | 5/1988 | Kimura et al. | 123/418 X |
| 4,996,958 | 3/1991 | Iwata et al. | 123/418 X |

Primary Examiner—Tony M. Argenbright
Attorney, Agent, or Firm—Pearne, Gordon, McCoy & Granger

[57] ABSTRACT

A method for controlling ignition timing of an internal combustion engine and an apparatus for practicing the method are disclosed which are adapted to determine ignition timing depending upon information on an engine speed detected, to thereby control the ignition timing. Pulsin signal counting is started evey time when a reference signal is generated from a signal generator to count first, second and third numbers N1, N2 and N3 of pulse signals, to thereby obtain information on an engine speed depending upon the difference between time T2 when the counting of the second number of pulse signals is completed and time T1 when that of the first number of pulse signals is completed, and then the information is used for obtaining ignition timing measuring time equal to a period of time between time T3 when the counting of the third number of pulse signals is completed and target ignition timing T1. The measuring of the ignition timing measuring time is started after the counting of the third number N3 of pulse signals is completed.

6 Claims, 11 Drawing Sheets

METHOD FOR CONTROLLING IGNITION TIMING OF INTERNAL COMBUSTION ENGINE AND APPARATUS THEREFOR

BACKGROUND OF THE INVENTION

This invention relates to a method for controlling ignition timing of an internal combustion engine and an apparatus for practicing the method.

Controlling of ignition timing of an internal combustion engine using a microcomputer is carried out by measuring a time interval between signals generated from a signal generator driven by the internal combustion engine to detect an average engine speed. Then, supposing that the engine rotates at the detected engine speed; a period of time from a reference position or a position at which the signal generator generates a predetermined signal to target ignition timing which is determined by a microcomputer depending upon the engine speed, the degree of opening of a throttle or the like is determined as ignition timing measuring time which is a period of time necessary for the engine to rotate from the reference position to an ignition position. The ignition timing measuring time is set in a timer for determining ignition timing and then the timer is started at the reference position to provide an ignition device for the internal engine with an ignition signal at the time when the timer counts a predetermined period of time, leading to ignition by the ignition device.

The signal generator is generally adapted to generate a signal at a maximum advance angle position or a minimum advance angle position, however, the ignition timing is generally measured on the basis of the maximum advance angle position.

Figure 1:
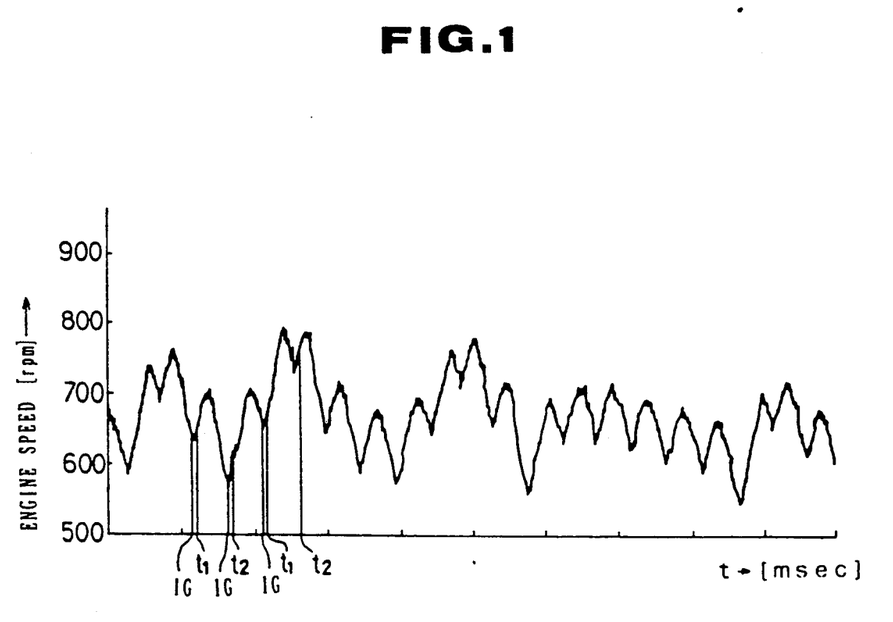
FIG. 1 is a diagrammatic view showing a variation in engine speed of an internal combustion engine.

FIG. 1 shows a variation in engine speed of a two-stroke-cycle three-cylinder internal combustion engine. The engine speed of the two-stroke-cycle engine is minimized at the end of the compression stroke and maximized due to explosion at a position of 30 to 60 degrees after the ignition. Also, when the replacement of gas in the cylinder during the scavenging stroke is failed or is not satisfactorily carried out, the subsequent explosion stroke is failed, resulting in the maximum value of the engine speed being lowered. When the replacement of gas in the next scavenging stroke satisfactorily takes place, combustion is effectively carried out in the subsequent explosion stroke, so that the engine speed may be increased. Thus, the engine speed is caused to be varied at every rotation of the engine.

In order to adequately control the ignition timing, it is desirable to determine the ignition timing on the basis of the engine speed detected at time as close to each ignition timing as possible.

An ignition timing control method which has been conventionally practiced for an internal combustion engine is adapted to obtain an average engine speed of the internal combustion engine depending upon a time interval between signals fed from a signal generator, to thereby obtain ignition timing measuring time on the basis of or depending upon the so-obtained engine speed. However, the conventional method determines the ignition timing measuring time depending upon an engine speed occurring due to the last ignition but one, to thereby fail to adequately control the ignition timing.

In the conventional method, for example, as shown in FIG. 1, a period of time from time $t_1$ immediately after one ignition to time $t_2$ immediately after the next ignition is measured to cause an ignition timing measuring timer to be started at the time $t_2$. Then, while the timer carries out the counting operation, an average value of the engine speed is obtained by operation based on both the period of time from the time $t_1$ to the time $t_2$ and the angle of rotation of the engine carried out during the period. Then, target ignition timing measuring time required for determining ignition timing at that time is operated on the basis of the so-obtained engine speed, so that the end time of the ignition timing measuring time is set in the timer. When the timer counts the end time, an ignition signal is fed to an ignition circuit, leading to the ignition operation.

As described above, the conventional method uses the engine speed occurring due to the last ignition but one as engine speed data used for determining each ignition timing, therefore, there is no correlation between each ignition timing and the engine speed data for determining it, resulting in failing to appropriately control the ignition position.

SUMMARY OF THE INVENTION

The present invention has been made in view of the foregoing disadvantage of the prior art.

Accordingly, it is an object of the present invention to provide a method for controlling an ignition position of an internal combustion engine which is capable of determining target ignition timing depending upon an engine speed detected just prior to the determination to adequately control the ignition timing.

It is another object of the present invention to provide an apparatus for controlling an ignition position of an internal combustion engine which is capable of determining target ignition timing depending upon an engine speed detected just prior to the determination to adequately control the ignition timing.

In accordance with one aspect of the present invention, a method for controlling ignition timing of an internal combustion engine is provided. In the method, a pulse signal generating means for generating a pulse signal every time when the internal combustion engine rotates by a micro angle and a signal generator for generating a reference signal at a predetermined angle position of rotation of the internal combustion engine are provided. The counting of the pulse signal is started every time when the reference signal is generated, resulting in time T1 at which a first number N1 of pulse signals are counted being stored. Also, the counting of the pulse signal is started at time when the counting of the first number N1 of pulse signals is completed to store time T2 at which a second number N2 of pulse signals are counted. The counting of a third number N3 of pulse signals is started at time when the counting of the first number N1 of pulse signals is completed or thereafter. Then, ignition timing measuring time equal to a period of time from time T3 at which the counting of said third number N3 of pulse signals is completed to target ignition timing Ti is obtained depending upon information on the engine speed obtained on the basis of the difference between the time T2 at which the counting of the second number N2 of pulse signals is completed and the time T1 at which the counting of the first number N1 of pulse signals is completed while the counting of the third number N3 of pulse signals is carried out. Thereafter, the measuring of the ignition timing measuring time is started at time when the counting of the third number N3 of pulse signals is completed to cause the ignition device to carry out the ignition operation when the measuring of the ignition timing measuring time is completed.

When the internal combustion engine is a multi-cylinder internal combustion engine, the signal generator is constructed so as to generate the reference signal for every cylinder and generate a cylinder discriminating signal between the reference signals corresponding to predetermined two of the cylinders, so that a time interval between the reference signals generated from the signal generator and a time interval between the cylinder discriminating signal and the reference signal generated prior thereto are compared with each other to discriminate the cylinder in which the ignition operation is to take place.

In accordance with another aspect of the present invention, there is provided an apparatus for controlling ignition timing of an internal combustion engine which is adapted to control time at which an ignition device for the internal combustion engine is fed with an ignition signal to control ignition timing of the internal combustion engine. The apparatus includes a pulse signal generating means for generating a pulse signal every time when the internal combustion engine rotates by a micro angle; a signal generator for generating a reference signal at a predetermined angle position of rotation of the internal combustion engine; a first pulse counting means for starting the counting of the pulse signal every time when the reference signal is generated to count a first number N1 of pulse signals; a first time storing means for storing time T1 at which the first pulse counting means completes the counting of the first number N1 of pulse signals; a second pulse counting means for starting the counting of the pulse signal at time when the counting of the first number N1 of pulse signals is completed to count a second number N2 of pulse signals; a second time storing means for storing time T2 when the second pulse counting means completes the counting of the second number N2 of pulse signals; a third pulse counting, means for starting the counting calculation at the time T1 when the counting of the first number N1 of pulse signals is completed or thereafter to carry out the counting calculation until the counting of a third number N3 of pulse signals is completed; an ignition timing calculating means for calculating target ignition timing Ti; an ignition timing measuring time calculating means for calculating ignition timing measuring time equal to a period of time from time T3 at which the third pulse counting means completes the counting calculation to the target ignition timing Ti depending upon information on the engine speed obtained on the basis of the difference between the time T2 at which the counting of the second number N2 of pulse signals is completed and the time T1 at which the counting of the first number N1 of pulse signals is completed while the third pulse counting means carries out the counting calculation; and an ignition signal feeding means for starting the measuring of the ignition timing measuring time at the time T3 when the third pulse counting means completes the counting calculation to feed an ignition device for the internal combustion engine with an ignition signal when the measuring of the ignition timing measuring time is completed.

When the internal combustion engine is a multi-cylinder internal combustion engine, the ignition device includes an ignition signal input terminal for every cylinder and the signal generator is constructed so as to generate the reference signal for every cylinder and generate a cylinder discriminating signal between the reference signals corresponding to predetermined two of the cylinders. A cylinder discriminating means is arranged for judging a reference signal generated next to the cylinder discriminating signal as a reference signal corresponding to each of the predetermined cylinders to discriminate the cylinder in which the ignition operation is to be carried out. Further, the ignition signal feeding means feeds the ignition signal to the ignition signal input terminal corresponding to the cylinder discriminated by the cylinder discriminating means.

The apparatus is also constructed so that the internal combustion engine includes an output shaft having a flywheel magneto mounted thereon and the pulse signal generating means comprises a ring gear made of iron and arranged on the outer periphery of a flywheel of the flywheel magneto and an inductor-type signal generator for inducing the pulse signal due to a variation in magnetic flux caused by the ring gear.

In a preferred embodiment of the present invention, the signal generator may comprise an inductor-type magnetic pole section provided at a part of said flywheel, and a signal generating element including a signal coil wound on a core having a magnetic pole section opposite to the inductor-type magnetic pole section and a magnet for permitting a magnetic flux to flow through the core. Also, the gear ring may be positioned with respect to the flywheel so that the relationship between the phase of the pulse signal and that of the reference signal is rendered constant.

When the flywheel is not provided with the ring gear, an encoder rotating in synchronism with the engine may be provided to obtain a pulse signal generated from the encoder at every micro angle of rotation of the engine.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein:

FIGS. 9(A-D) are a diagrammatic view showing a signal waveform and the counting operation by a counter and a timer in the apparatus shown in FIG. 4;

FIGS. 11(A-D) are a diagrammatic view showing a signal waveform in the apparatus shown in FIG. 10.

DETAILED DESCRIPTION OF THE PREFERRED EMBODIMENTS

Now, the present invention will be described hereinafter with reference to FIGS. 2 to 13.

First, a general construction of the present invention which is adapted to control ignition timing of an internal combustion engine will be described with reference to FIGS. 2 and 3.

A pulse signal generating means 1 for generating a pulse signal every time when the internal combustion engine rotates by a micro angle and a signal generator 2 for generating a reference signal at a predetermined angle position of rotation of the internal combustion engine are provided. The counting of the pulse signal is started every time when the reference signal is generated, resulting in time T1 at which a first number N1 of pulse signals are counted being stored. The counting and storing are accomplished through a first pulse counting means 3 and a first time storing means 4, respectively. Also, the counting of the pulse signal is started through a second pulse counting means 5 at time when the counting of the first number N1 of pulse signals is completed to store, in a second time storing means 6, time T2 at which a second number N2 of pulse signals are counted. The counting of a third number N3 of pulse signals is started through a third pulse counting means 7 at time when the counting of the first number N1 of pulse signals is completed or thereafter. Then, ignition timing measuring time equal to a period of time from time T3 at which the counting of the third number N3 of pulse signals is completed to target ignition timing Ti is obtained depending upon information on the engine speed obtained on the basis of the difference between the time T2 at which the counting of the second number N2 of pulse signals is completed and the time T1 at which the counting of the first number N1 of pulse signals is completed while the counting of the third number N3 of pulse signals is carried out. Thereafter, the measuring of the ignition timing measuring time is started at time when the counting of the third number N3 of pulse signals is completed to cause an ignition device 10 to carry out the ignition operation when the measuring of the ignition timing measuring time is completed. The target ignition timing is calculated by an ignition timing calculating means 8 and the ignition timing measuring time is calculated by an ignition timing measuring time calculating means 9. Reference numeral 11 designates an ignition signal feeding means for feeding the ignition device 10 with an ignition signal. In FIG. 3, 12 is a cylinder discriminating means.

Figure 4:
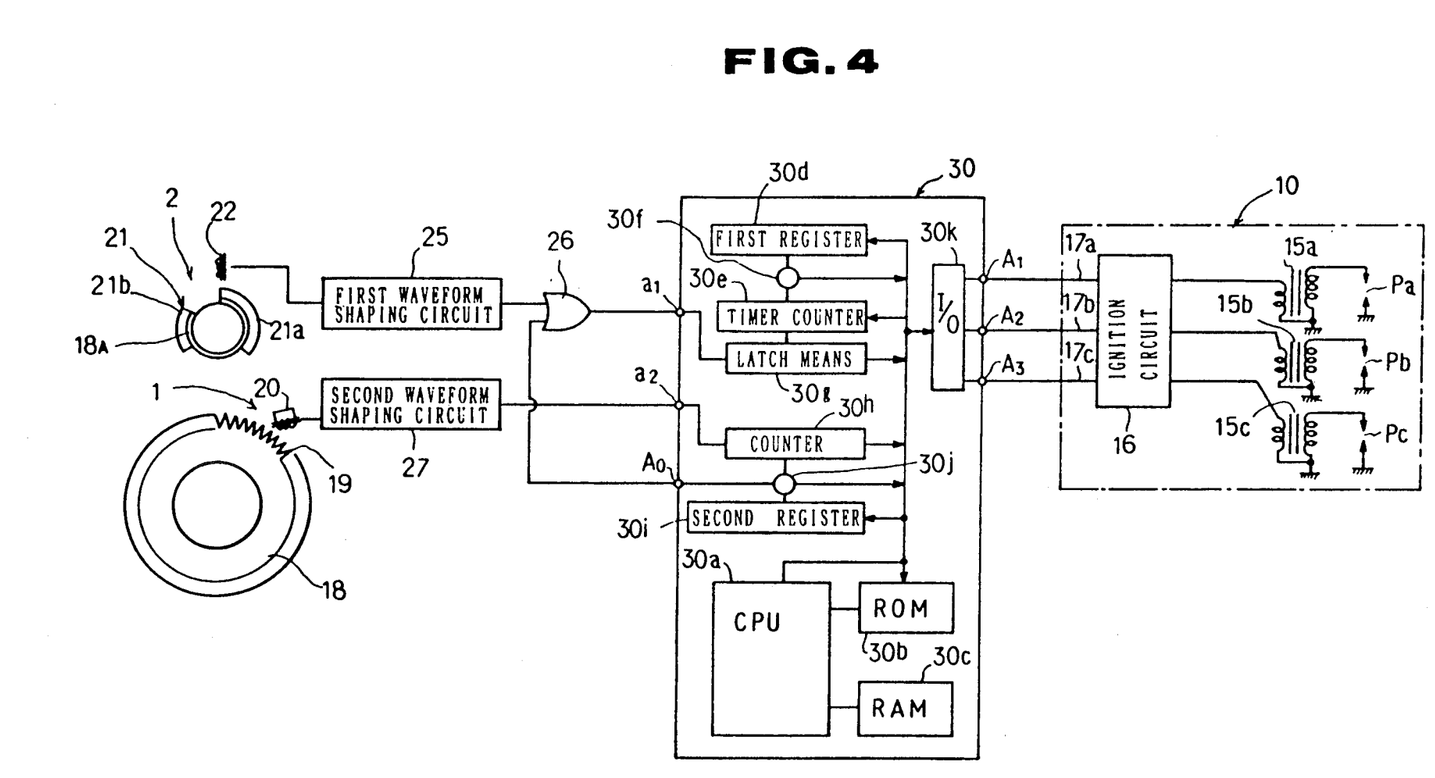
FIG. 4 is a block diagram showing an embodiment of an apparatus for controlling ignition timing of an internal combustion engine according to the present invention.

FIG. 4 shows an embodiment of an apparatus for controlling ignition timing of an internal combustion engine, which is adapted to ignite a two-stroke-cycle three-cylinder internal combustion.

An ignition device for an internal combustion engine generally designated at reference numeral 10 in FIG. 4 includes three ignition coils 15a to 15c respectively corresponding to three or first to third cylinders of the engine, an ignition circuit 16 for controlling a primary current flowing through each of the ignition coils, and ignition plugs Pa to Pc respectively mounted on the first to third cylinders and connected to secondary windings of the ignition coils 15a to 15c. The ignition circuit 16 includes ignition signal input terminals 17a to 17c respectively provided corresponding to the first to third cylinders. The ignition circuit 16 functions to rapidly vary the primary current of the ignition coil when an ignition signal is input or fed to the corresponding ignition signal input terminal, to thereby cause a high voltage for ignition to be induced across the secondary winding of the ignition coil.

A pulse signal generating means 1 includes a ring gear 19 made of iron and provided on the outer periphery of a cup-like flywheel 18 mounted on an output shaft of the engine and an inductor-type signal generating element 20 arranged opposite to teeth of the ring gear 19. The flywheel 18 has permanent magnets (not shown) mounted on the inner periphery thereof, so that the flywheel and permanent magnets cooperate together to form a magnet rotor, which then cooperates with a stator (not shown) to form a magneto.

The signal generating element 20 may be constructed in such a manner as widely known in the art. More particularly, it includes a core including a magnetic pole section arranged opposite to the teeth of the ring gear 19, a signal coil wound on the core and a permanent magnet for permitting a magnetic flux to flow through the core and is adapted to induce a pulse-like signal on the signal coil every time when each of the teeth of the ring gear 19 is aligned opposite to the magnetic pole section of the signal generating element 20.

Figure 9:
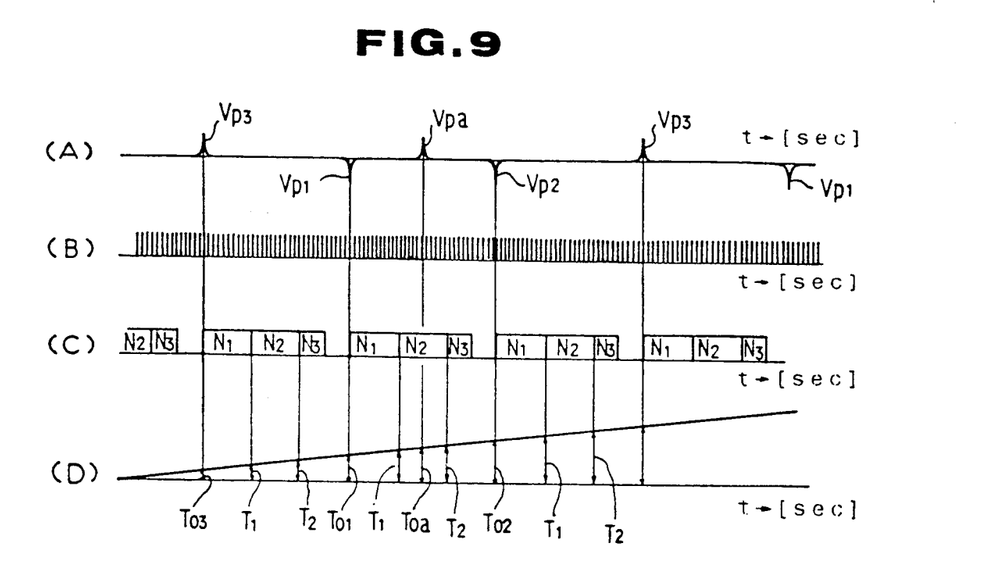

A signal generator 2 includes a rotor 21 constructed by providing a boss section 18A of the flywheel 18 with inductor-type magnetic pole sections 21a and 21b different in length from each other. The signal generator 2 also includes a signal generating element 22 including a signal coil wound on a core provided at the distal end thereof with magnetic pole sections opposite to the inductor-type magnetic pole sections 21a and 21b and a magnet for permitting a magnetic flux to flow through the core. The so-constructed signal generating element 22 is adapted to generate such pulse signals as indicated at (A) in FIG. 9. Pulse signals Vp3 and Vp1 shown in FIG. 9 are generated at the time when the long inductor-type magnetic pole section 21a starts to be opposite to the signal generating element 22 and at the time when the magnetic pole section 21a starts to be released from the state of being opposite to the signal generating element 22, respectively. Pulse signals Vpa and Vp2 are generated at the time when the short inductor-type magnetic pole section 21b starts to be opposite to the signal generating element 22 and at the time when it starts to be released from the state of being opposite to the signal generating element 22, respectively. The pulse signals Vp1, Vp2 and Vp3 are used as first to third reference signals corresponding to the first to third cylinders of the internal combustion engine, respectively, and the pulse signal Vpa generated between the pulse signal Vp1 corresponding to the first cylinder and the pulse signal Vp2 corresponding to the second cylinder is used as a cylinder discriminating signal. In the illustrated embodiment, the first to third reference signals Vp1 to Vp3 each are adapted to be generated at a position of five degrees forward of the top dead center of each of the first to third cylinders (minimum advance angle position).

The pulse signals Vp1, Vpa, Vp2 and Vp3 are input to a first waveform shaping circuit 25, resulting in being converted into pulse signals of the same polarity, which are then supplied through an OR circuit 26 to an input port a1 of a microcomputer 30.

A pulse signal generated from the pulse signal generating means 1 is fed to a second waveform shaping circuit 27, in which only a pulse signal of one polarity is taken out. More specifically, from the waveform shaping circuit 27, as indicated at (B) in FIG. 9, are generated pulse signals of the same polarity. The number of pulse signals generated at every rotation is equal to the number of teeth of the ring gear. The pulse signals thus generated are fed to an input port a2 of the microcomputer 30.

The microcomputer 30 includes a CPU 30$a$, a ROM 30$b$ having a predetermined program stored therein, a RAM 30$c$ in which data are written as desired, a first register 30$d$ to which ignition position measuring time is fed, a timer counter 30$e$ for counting clock pulses, a comparator 30$f$ for generating a signal when a content of the first register 30$d$ and a value counted by the timer counter 30$e$ coincide with each other, a latch means 30$g$ for latching the counted value every time when a signal is fed from the OR circuit 26 to the input port al, a counter 30$h$ for counting pulse signals for measuring a rotational angle which are fed to the input port a2, a second register 30$i$ to which first to third counted values N1 to N3 are successively supplied, and a comparator 30$j$ for permitting a signal to be supplied from an output port Ao to the OR circuit 26 when a value counted by the counter 30$h$ and a content of the second register 30$i$ coincide with each other. The above-described components 30$a$ to 30$i$ are connected to one another by means of internal buses.

In the microcomputer 30 are constructed the function means 3 to 9 and 10 to 12 shown in FIG. 3 by means of a predetermined program prepared according to algorithm described hereinafter, so that when ignition timing for each of the first to third cylinders of the engine is measured, ignition signals for the first to third cylinders are supplied through an input/output (I/O) interface 30$k$ to output ports A1 to A3, respectively. The ignition signals thus input to the output ports A1 to A3 are then fed to the ignition signal input terminals 17$a$ to 17$c$ of the ignition circuit 16, so that the ignition circuit 16 controls a primary current flowing through each of the ignition coils 15$a$ to 15$c$ for the first to third cylinders upon inputting of the ignition signals to the input terminals 17$a$ to 17$c$, to thereby cause a high voltage for ignition to be induced across the secondary winding of each of the ignition coils.

Figure 5:
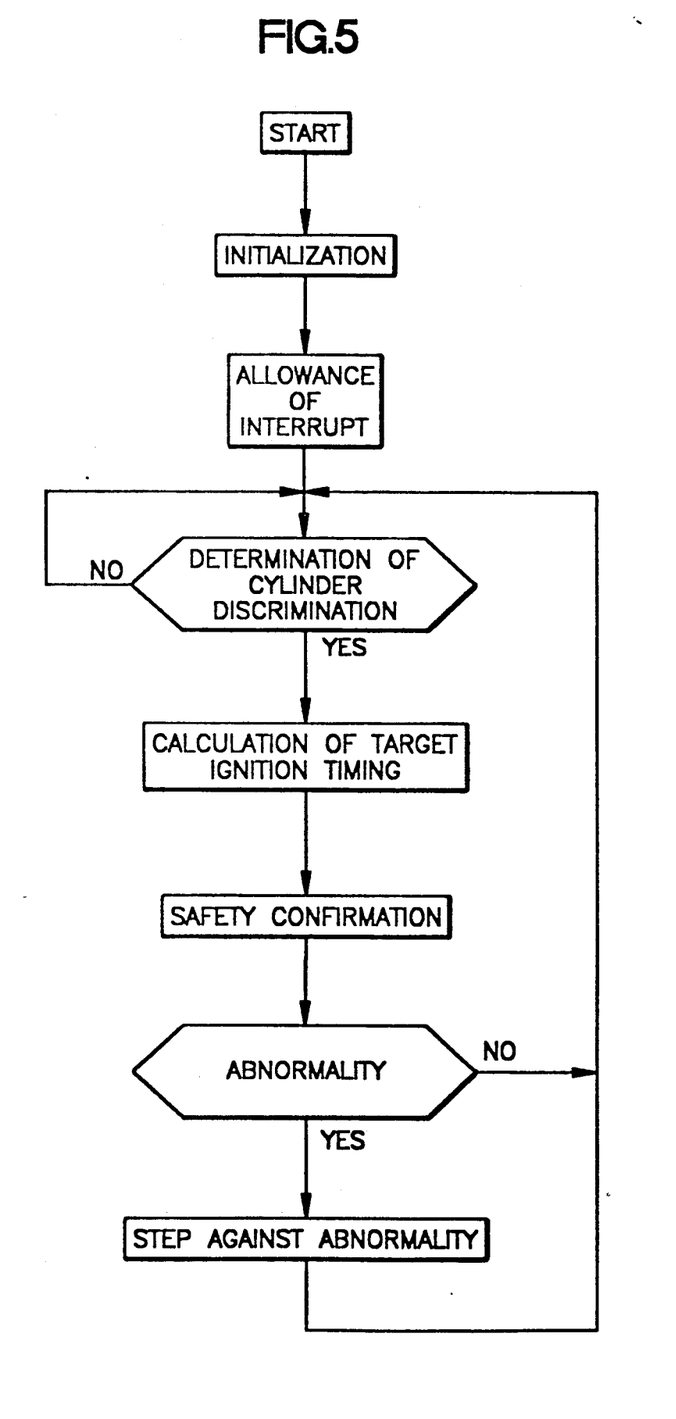
FIGS. 5 to 8 each are a flow chart showing control algorithm in the apparatus shown in FIG. 4.
Figure 6:
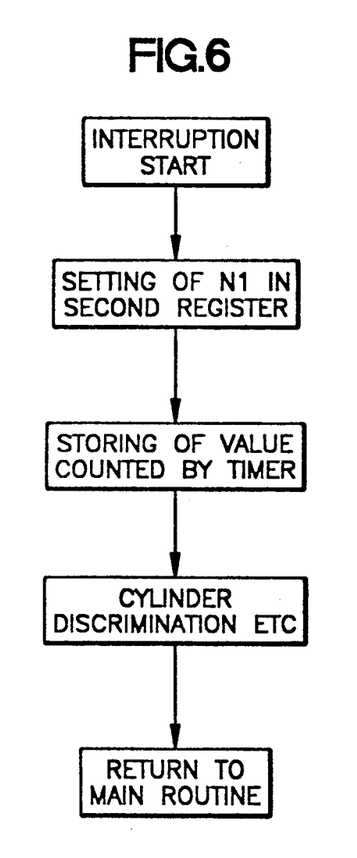

The program stored in the ROM 30$b$ of the microcomputer 30 is prepared according to algorithm shown in FIGS. 5 to 8. A main routine therefor is as shown in FIG. 5. More specifically, when the program is started, initialization takes place at each section and then interruption is allowed. When any one of the reference signals Vp1 to Vp3 and cylinder discriminating signal Vpa is input or fed to the input port al, an interruption routine shown in FIG. 6 is executed to cause a first number N1 to be set in the second register 30$i$ and the value counted by the timer counter 30$e$ (or time when the signal is input to the input port) to be latched, resulting in the value being stored in the RAM 30$c$. Also, the difference between the so-stored time and time when the signal was input to the input terminal al at the last time is calculated to provide cylinder discriminating data, which are then stored in the RAM and used for discriminating the cylinders.

More particularly, supposing that the reference signals Vp1, Vp2 and Vp3 are fed to the input port al at time T01, time T02 and time T03, respectively, and the cylinder discriminating signal Vpa is fed thereto at time T0$a$, time differences T01-T03, T0$a$-T01, T02-T0$a$—are successively operated and stored. Then, the time differences are compared with one another; so that where the cylinder discriminating signal Vpa occurs between the first reference signal Vp1 and the second reference signal Vp2 as indicated at (A) in FIG. 9, it is judged that the reference signal Vp2 subsequently fed to the input port al is a reference signal corresponding to the second cylinder when T01-T03 k (T0$a$-T01) is detected. Such cylinder discrimination takes place at every rotation of the engine. The coefficient k is set to be a value appropriate sufficiently to permit the cylinder discrimination to be carried out even when the difference T0$a$-T01 is varied at the time of start of the engine which renders the rotation of the engine unstable or increase the difference T01-T03. In general, k is set to be smaller than 1 (k<1).

When the cylinder discrimination is completed, the program is returned to the main routine shown in FIG. 5. In the main routine, target ignition timing is operated depending upon the degree of opening of a throttle and the like. The degree of opening of the throttle is detected through a detection means every time when it is varied, resulting in being stored as digital information in the RAM. Also, for the sake of safety, the illustrated embodiment is adapted to detect any abnormality such as overheat of the engine, overspeed of the engine or the like. When any abnormality is detected, any suitable step against the abnormality such as delay of the ignition timing for restricting the engine speed to a level of a predetermined safety engine speed or less, a decrease in the number of spark ignitions, or the like is taken. However, such a step is not included in the scope of the present invention, accordingly, it will not be described further herein.

When the pulse signal value counted by the counter 30$h$ coincides with the first value or number N1 input to the second register 30$i$, a signal is fed from the output port Ao through the OR circuit 26 to the input port al and a value counted by the timer counter 30$e$ at that time (or time T1 at which counting of the first number N1 of pulse signals is completed) is latched.

Figure 7:
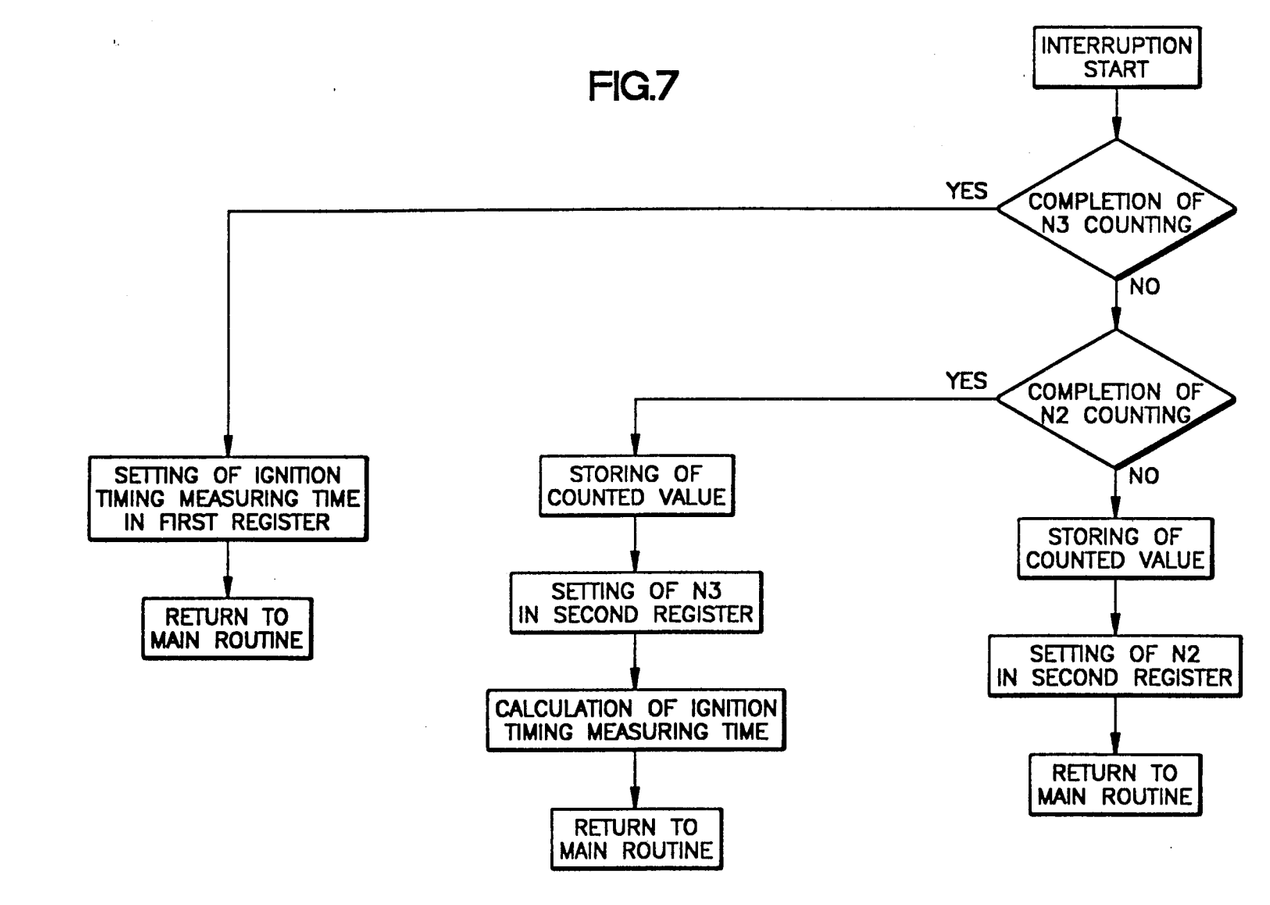

An interruption routine shown in FIG. 7 is executed every time when the value counted by the counter 30$h$ coincides with the content of the second register 30$i$. In the interruption routine, whether the counting of the third number N3 of pulse signals is completed is initially judged and then whether the counting of the second number N2 of pulse signals is completed is judged. However, the counting of the second number N2 of pulse signals and that of the third number N3 of signal pulse are not completed yet at the stage that the counting of the first number N1 of pulse signals is completed, therefore, the program progresses to a step of storing the value counted by the timer counter 30$e$. This results in the time T1 at which the counting of the first number N1 of pulse signals is completed being stored. Then, the second number N2 is set in the second register 30$i$ and the program is returned to the main routine. When the value counted by the counter 30$h$ coincides with the second number N2 stored in the second register 30$i$, the value counted by the timer counter 30$e$ is latched and the interruption routine shown in FIG. 7 is executed again, so that the counted value of the timer counter 30$e$ latched (or time T2 when the counting of the second number N2 of pulse signals is completed) is stored. Thereafter, the third number N3 is stored in the second register 30$i$ and then ignition timing measuring time is subject to operation. In this process, information on the engine speed is obtained on the basis of the time difference between the time T2 at which the counting of the second number N2 of pulse signals is completed and the time T1 at which the counting of the first number N1 of pulse signals is completed and an angle of rotation of the engine carried out during the time difference, so that data on ignition timing Ti operated in the main routine is converted into "ignition timing measuring time" equal to a period of time from the time at which the counting of the number N3 of pulse signals is completed to the ignition timing Ti. Then, the program is returned to the main routine. The angle of rotation described above is obtained on the basis of the number of teeth of the ring gear.

Then, when the value counted by the counter 30h coincides with the third number N3 set in the second register 30i, the counted value is latched and the interruption routine of FIG. 7 is executed. At this time, in the interruption routine of FIG. 7, the ignition timing measuring time already operated is set in the first register 30e and the counter 30h is reset, resulting in it being stopped, so that the program is returned to the main routine.

Figure 8:
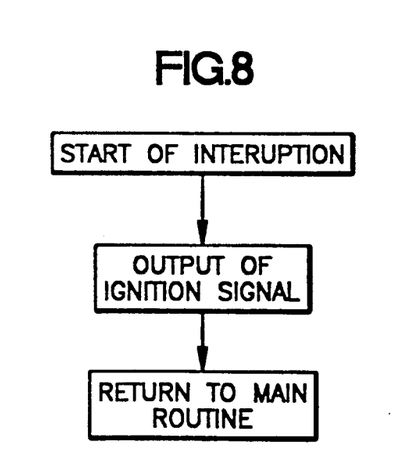

When the value counted by the timer counter 30e coincides with the content of the first register 30d, an interruption routine shown in FIG. 8 is executed, so that an ignition signal is fed to the ignition signal input terminal of the cylinder being discriminated.

Reference character (D) in FIG. 9 indicates a manner in which the counted value by the timer counter increases, as well as the counted values by the timer counter which are latched when the counting of the first number N1 of pulse signals and that of the second number N2 of pulse signals are completed. The counted values T1 and T2 are varied for every cylinder and therefore for every reference signal, however, they are designated at the same reference characters for clarity in the description.

In the illustrated embodiment, in FIG. 6, the first pulse counting means 3 is realized in the process of setting the first number N1 in the second register 30i to cause the counter 30h to count the pulse signal, and the first time storing means 4 is realized in the process of storing the value counted by the timer counter 30e when the value counted by the counter 30h coincides with the first number N1.

Also, in FIG. 7, the second pulse counting means 5 is realized in the process of setting the second number N2 in the second register 30i to cause the counter 30h to count the pulse signal and the second time storing means 6 is realized in the process of storing the value counted by the timer counter 30e when the value counted by the counter 30h coincides with the second number N2.

In addition, in FIG. 7, the third pulse counting means 7 is realized in the process of setting the third number N3 in the third register 30i to cause the counter 30h to carry out counting of the pulse signal.

Further, the ignition timing calculating means 8 is realized in the process of calculating the ignition timing in the main routine of FIG. 5 and the ignition timing measuring time calculating means 9 is realized in the process of calculating the ignition timing measuring time in FIG. 7.

Furthermore, the ignition signal feeding means 11 is realized in the interruption routine of FIG. 8 and the cylinder discriminating means 12 is constituted in the process of discriminating the cylinders in FIG. 7.

Figure 2:
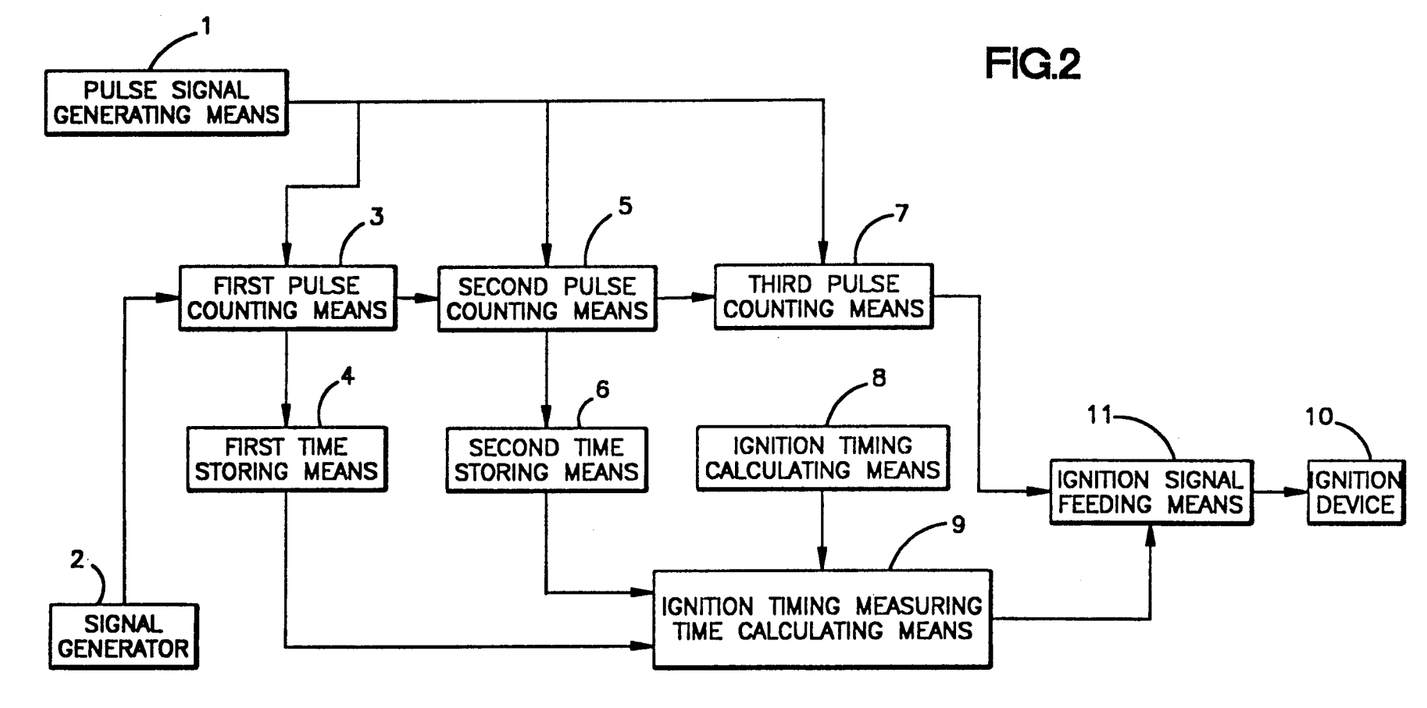
FIGS. 2 and 3 each are a block diagram showing a general construction of an apparatus of the present invention which is adapted to practice a method for controlling ignition timing of an internal combustion engine.
Figure 3:
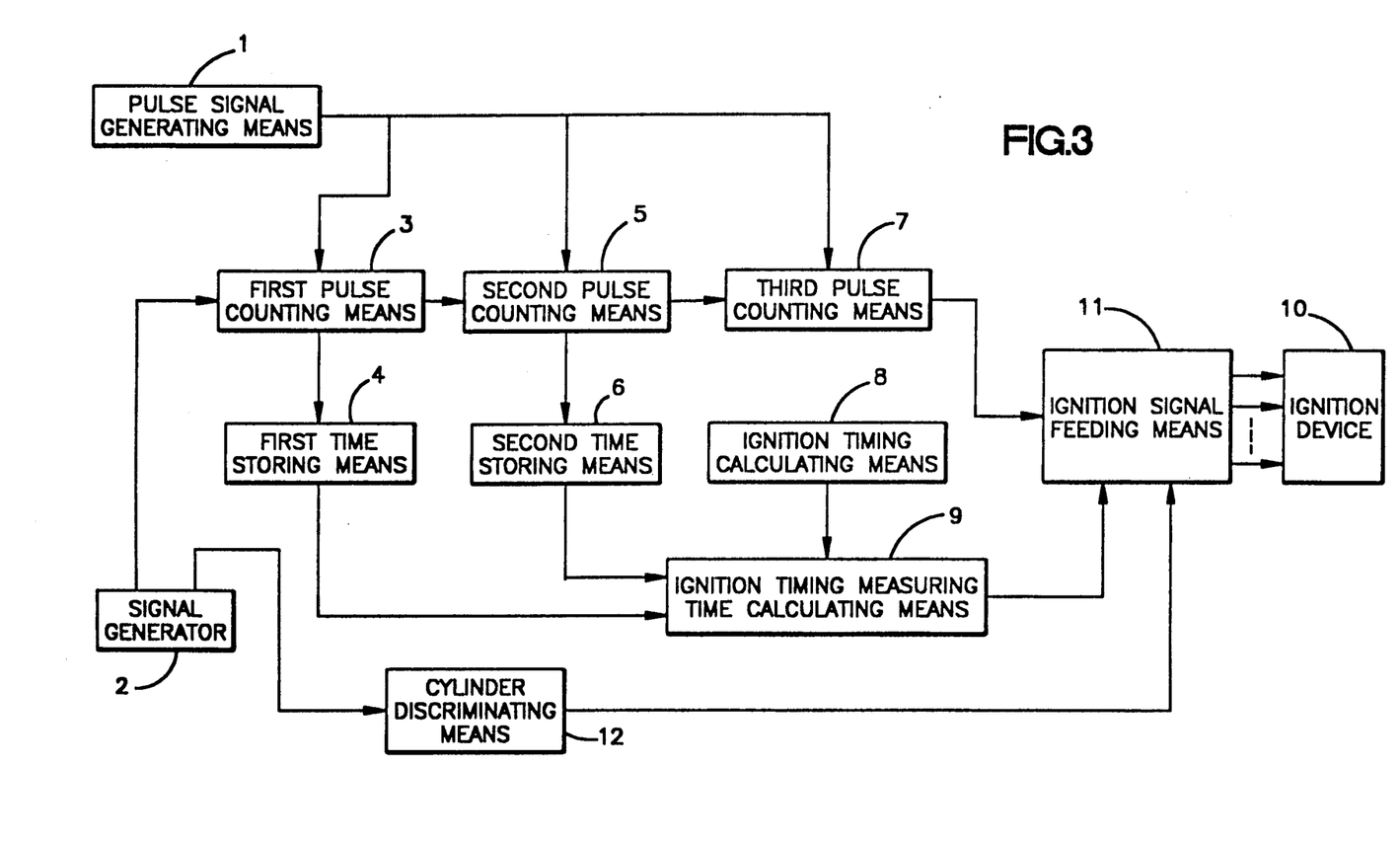

It is a matter of course that the cylinder discriminating means is eliminated as shown in FIG. 2 when the internal combustion engine comprises a single-cylinder engine.

The illustrated embodiment, as described above, is so constructed that information on the engine speed is obtained on the basis of a period of time between the time T1 at which the counting of the first number N1 of pulse signals is completed and the time T2 at which the counting of the second number N2 of pulse signals is completed. The period of time during which the information is obtained is desirably set so as to permit an instantaneous engine speed of the engine to be relatively stabilized or a variation in speed of the engine for every rotation to be reduced. Also, it is desirable that the period of time is close to time at which the measuring of the ignition timing is actually started. In the present invention, the period of time during which information on the engine speed is obtained (or the period of time for which the second number N2 of pulse signals are counted) may be set as desired by suitably setting the first number N1.

In a two-stroke-cycle engine, the period of time during which the second number N2 of pulse signals are counted is preferably set in a region in which the rotation of the engine depends upon inertia, resulting in the engine speed being reduced (compression stroke). The first number N1 may be suitably varied depending upon the characteristics of the engine and the engine speed (which is obtained on the basis of the period of time for which the second number N2 of pulse signals are counted) so that the region in which the counting of the second number N2 is carried out is made optimum depending upon the characteristics and speed of the engine.

The counted values are required to be set so that the sum of the period of time for which the first number N1 of pulse signals are counted, that for which the second number N2 of pulse signals are counted and that for which the third number N3 of pulse signals are counted is short as compared with a period of time between the generation of each of the reference signals and the ignition of the cylinder corresponding to the reference signal. The period of time from the generation of each reference signal to the ignition of the cylinder corresponding to the reference signal is varied with a variation in engine speed, therefore, the values of the first to third numbers N1 to N3 are preferably varied depending upon the engine speed.

As described above, the construction of the illustrated embodiment that the counting of the second number N2 of pulse signals is carried out to obtain information on the engine speed at the time T2 and then the measuring of the ignition timing is started at the time T3 at which the counting of the third number N3 of pulse signals is carried out not only permits the ignition timing measuring time to be operated during the period of time therebetween but an error due to a variation in engine speed occurring between the time T2 at which the engine speed information is obtained and the time T3 at which the measuring of the ignition timing measuring time is started to be corrected. More particularly, supposing that the engine speed increases between the time T2 and the time T3, the ignition timing measuring time operated is excessively long. However, this causes a position at which the measuring of the ignition timing measuring time is started to advance, to thereby reduce a deviation between the actual ignition timing and the target ignition timing.

Also, a decrease in engine speed between the time T2 and the time T3 indicates that the operated ignition timing measuring time is too short; however, this causes the position at which the measuring of the ignition timing measuring time is started to delay, to thereby likewise reduce a deviation between the actual ignition timing and the target one.

In the construction of the illustrated embodiment that the pulse signals are obtained b of the gear ring, when the number of ring gear teeth is indivisible by the number of cylinders, the number of pulse signals is caused to be varied between the reference signals. In this instance, it is required to prepare a software which causes the first to third numbers N1 to N3 set with respect to each cylinder in the second register 30*i* after the reference signal for each of the cylinders is generated to be varied for every cylinder. Such a variation in first to third numbers N1 to N3 thus set with respect to each cylinder are varied causes the ignition timing to be deviated when the relationship between the phase of generation of the reference signal and that of the pulse signal is varied for every product, to thereby fail to accurately control the ignition timing. Accordingly, when the ring gear is mounted on the flywheel, it is required to keep the positional relationship between the teeth of the ring gear and the inductor-type magnetic pole section of the signal generator provided at a part of the flywheel constant.

In the above-described embodiment, the pulse signals are obtained by means of the ring gear. However, in the present invention, it is merely required to generate the pulse signal generated at every micro-angle of rotation of the engine. Therefore, the pulse signal may be generated at every micro-angle of rotation of the engine by constructing an encoder by a code plate mounted on a member rotated in synchronism with the engine such as, for example, the flywheel and a sensor for reading codes arranged on the code plate.

In the illustrated embodiment, it is desirable to provide a circuit for feeding, as ignition signals, the reference signals Vp1 to Vp3 generated at the maximum delay angle position to the ignition circuit rather than the microcomputer in order to permit the ignition operation to be satisfactorily carried out even when the microcomputer gets out of order.

Figure 11:
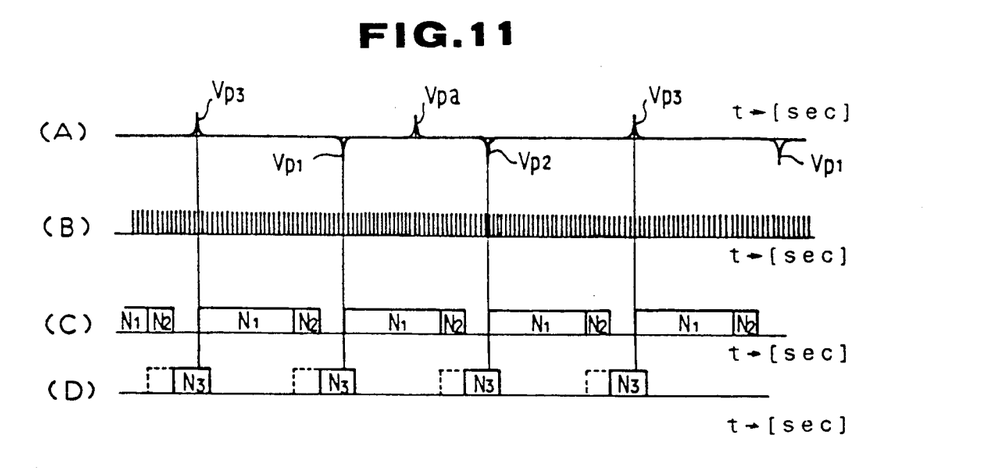

In the illustrated embodiment, as described above, the counting of the first to third numbers N1 to N3 is carried out by means of the single counter 30*h*. However, a microcomputer is generally provided therein with a plurality of counters, therefore, the counting of the third number N3 may take place through a counter other than the counter 30*h*. In this instance, the counting of the third number N3 is started at the time when the counting of the second number N2 is completed or thereafter. In general, the counting of the third number N3 is preferably started at the time T2 when the counting of the second number N2 is completed as indicated at the solid line in (D) of FIG. 11 or at the time T1 when the counting of the first number N1 is completed as indicated at the broken lines in (D) of FIG. 11. The counting of the third number N3 may be carried out at time other than the above-described time T1 or T2 such as, for example, at suitable time within a period of time during which the counting of the second number N2 takes place. In this instance, it is required to measure a period of time from the completion of counting of the first number N1 to the start of counting of the third number N3 in order to specify the time when the counting of the third number N3 is started.

It is a matter of course that the time when the counting of the third number N3 is completed is required to be set at time when the calculation of the engine speed and that of the ignition timing measuring time are completed after the counting of the second number N2 is completed, or thereafter.

Figure 10:
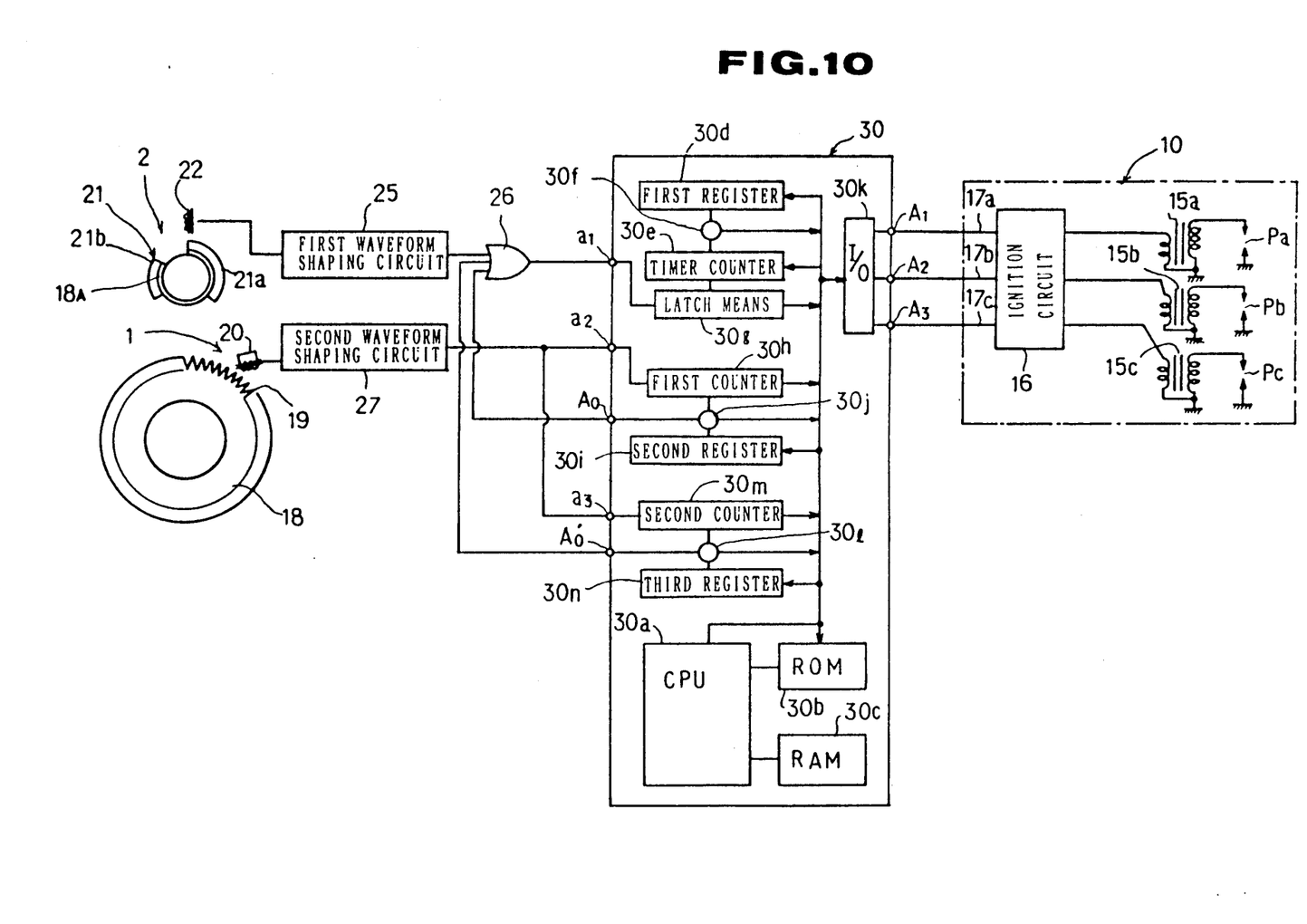
FIG. 10 is a block diagram showing another embodiment of an apparatus for controlling ignition timing of an internal combustion engine according to the present invention.

FIG. 10 shows another embodiment of an apparatus for controlling ignition timing of an internal combustion engine according to the present invention, which is adapted to count a third number N3 by means of another counter.

For this purpose, the embodiment shown in FIG. 10 includes, in addition to a first counter 30*h* corresponding to the counter 30 shown in FIG. 4, a second counter 30*m*, a third counter 30*n* and a comparator 30*l* for generating a signal when a value counted by the second counter 30*m* coincides with a content of the third register 30*n*. An output of the comparator 30*l* is fed through an output port Ao' to an OR circuit 26. Also, an output of a second waveform shaping circuit 27 is fed through an input port a3 to the second counter 30*m*. The remaining part of the embodiment shown in FIG. 10 may be constructed in substantially the same manner as that shown in FIG. 4.

Figure 12:
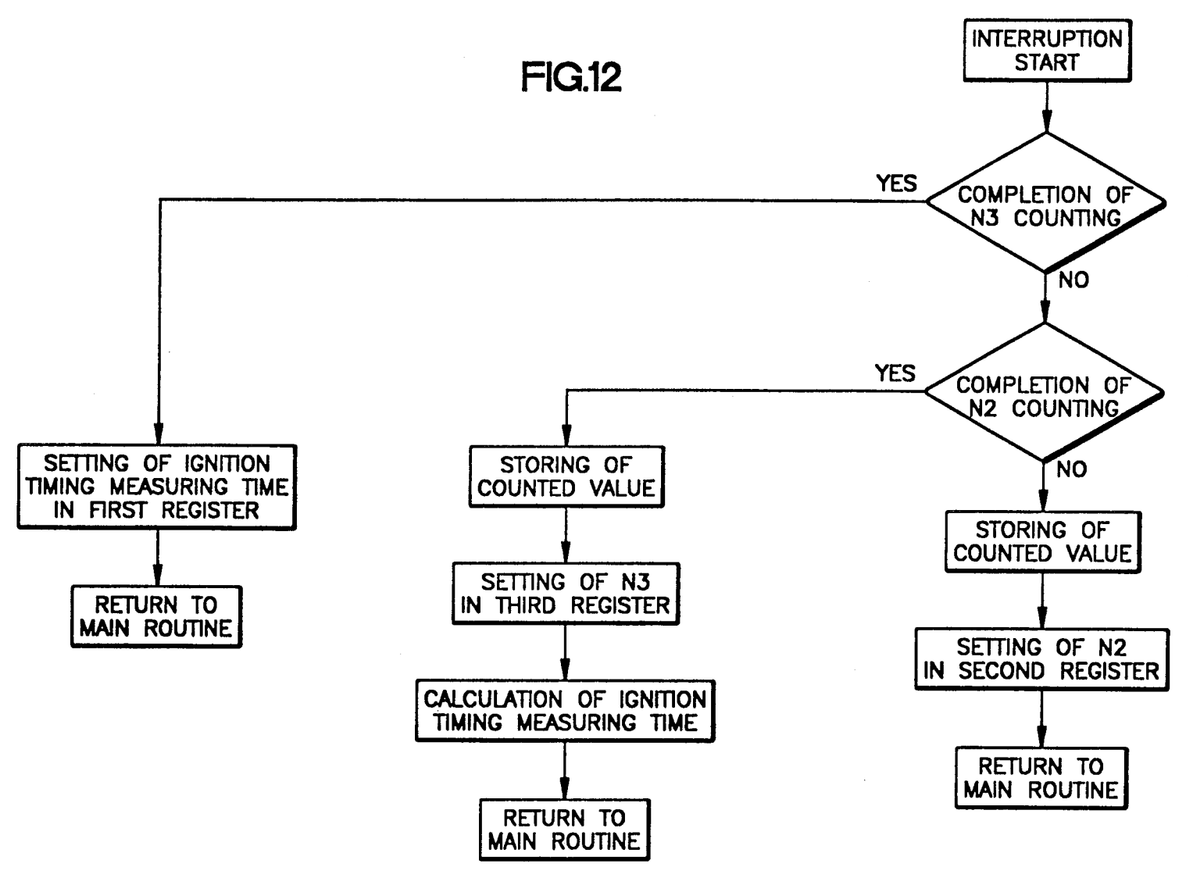
FIGS. 12 and 13 each are a flow chart showing control algorithm in the apparatus of FIG. 10.
Figure 13:
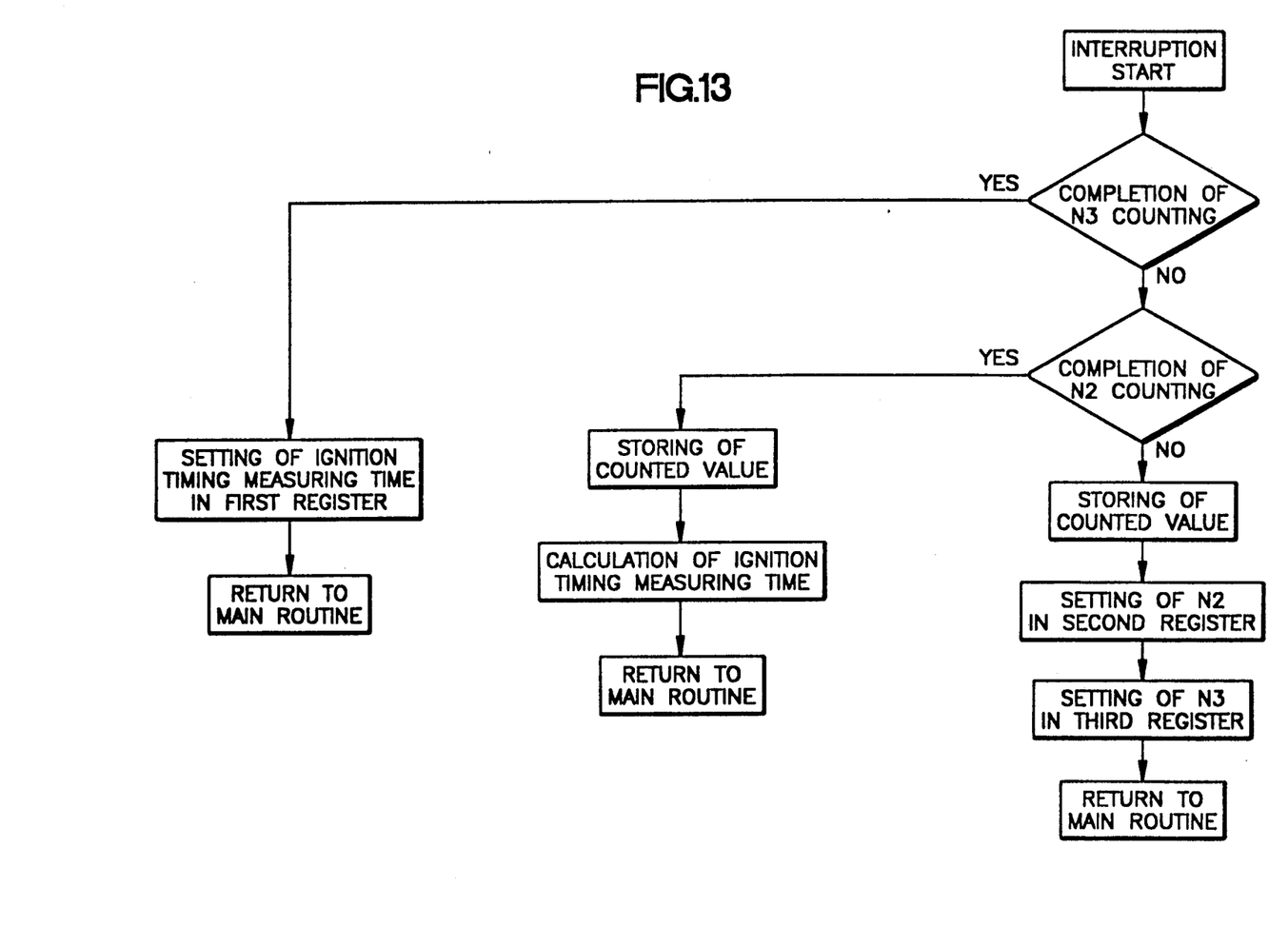

In the embodiment of FIG. 10, the third number N3 is input to the third register 30*n* to cause the second counter 30*m* to carry out pulse signal counting, so that when the counted value of the pulse signals coincides with a content of the third register 30*n*, a value counted by a timer counter 30*e* is latched and internal interruption is carried out to execute an interruption routine shown in FIG. 12 or 13.

The interruption routine shown in FIG. 12 is substantially the same as the interruption routine shown in FIG. 7 except that the third number N3 is set in the third register. When the interruption routine of FIG. 12 is executed, the counting of the third number N3 is started at time when the counting of a second number N2 is completed, as indicated at the solid line in (D) of FIG. 11.

The interruption routine shown in FIG. 13 is substantially the same as that shown in FIG. 7, except that the third number N3 is set in the third register 30*n* after the second number N2 is set in the second 30*i* and the ignition timing measuring time is calculated immediately after the value counted by the timer counter is stored at the time when the counting of the second number N2 is completed. In the execution of the interruption routine shown in FIG. 13, the counting of the third number N3 is started at time T1 when the counting of a first number N1 is completed, wherein time when the counting of the, third number N3 is completed is set at time when the calculation of the engine speed and that of the ignition timing measuring time are completed after the counting of the second number N2 is completed, or thereafter.

When the apparatus of the present invention, as described above, is so constructed that the counting of the third number N3 of pulse signals is carried out through a counter other than a counter for counting the second number N2 of pulse signals, the angle of rotation of the engine may exceed the angle of rotation between reference signals $V_{p1}$, $V_{p2}$,—(for example, 120 degrees in the case of a three-cylinder engine). A reference signal is generally generated at the minimum advance angle position of an engine (for example, 10 degrees in advance of the top dead center); however, the above-described construction of the illustrated embodiment permits the position at which the counting of the third number N3 is completed to be set to be a position further later than ten degrees in advance of the top dead center (or a position close to the top dead center), to thereby render the ignition operation stable even it takes place at a position in delay of the position at which the reference signal is generated.

Moreover, the illustrated embodiment permits the program to be designed with a wide degree of freedom since it is not required to limit the time at which the counting of the third number N3 is started to the time when the counting of the second number N2 is completed.

As can be seen from the foregoing, the present invention is so constructed that the pulse signal counting is started every time when the reference signal is generated from the signal generator to count the first, second and third numbers N1, N2 and N3 of pulse signals, resulting in information on the engine speed being obtained depending upon the difference between the time T2 when the counting of the second number of pulse signals is completed and the time T1 when that of the first number of pulse signals is completed, and then the so-obtained information is used for obtaining the ignition timing measuring time equal to a period of time from the time T3 when the counting of the third number of pulse signals is completed to the target ignition timing T1. Such construction permits the first number N1 to be suitably set depending upon characteristics on a variation in engine speed, so that the period of time between T1 and T2 during which information on the engine speed is obtained may be set in a region which permits a variation in engine speed to be minimized, resulting in the information being adequately obtained. Also, the above-described construction of the present invention permits the engine speed occurring due to ignition carried out just before to be adequately detected and the ignition timing measuring time to be operated depending upon the so-detected engine speed, so that the ignition timing may be properly controlled.

Also, in the present invention, the measuring of the ignition timing measuring time is started after the counting of the third number N3 of pulse signals is completed; therefore, it is possible to correct any error due to a variation in engine speed occurring between the time T2 at which information on the engine speed is obtained and the time at which the measuring of the ignition timing measuring time is actually started, to thereby significantly reduce an error of ignition timing due to an instantaneous variation in engine speed.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A method for controlling ignition timing of an internal combustion engine which is adapted to control time at which an ignition device for the internal combustion engine is fed with an ignition signal to control ignition timing of the internal combustion engine, comprising:

providing a pulse signal generating means for generating a pulse signal every time when the internal combustion engine rotates by a micro angle and providing a signal generator for generating a reference signal at a predetermined angular position of rotation of the internal combustion engine;

starting the counting of said pulse signal every time when said reference signal is generated to store time T1 at which a first number N1 of pulse signals are counted;

further starting the counting of said pulse signal at time when the counting of said first number N1 of pulse signals is completed to store time T2 at which a second number N2 of pulse signals are counted;

starting the counting of a third number N3 of pulse signals at time when the counting of said first number N1 of pulse signals is completed or thereafter;

obtaining ignition timing measuring time equal to a period of time from time T3 at which the counting of said third number N3 of pulse signals is completed to target ignition timing Ti depending upon information on the engine speed obtained on the basis of the difference between the time T2 at which the counting of said second number N2 of pulse signals is completed and the time T1 at which the counting of said first number N1 of pulse signals is completed while the counting of said third number N3 of pulse signals is carried out; and starting the measuring of said ignition timing measuring time at a time when the counting of said third number N3 of pulse signals is completed to cause the ignition device to carry out the ignition operation when the measuring of said ignition timing measuring time is completed.

2. A method as defined in claim 1, wherein said internal combustion engine comprises a multi-cylinder internal combustion engine including at least two cylinders; and said signal generator is constructed so as to generate said reference signal for every cylinder and generate a cylinder discriminating signal between the reference signals corresponding to predetermined two of the cylinders;

comparing a time interval between the reference signals generated from said signal generator and a time interval between the cylinder discriminating signal and the reference signal generated prior thereto with each other to discriminate the cylinder in which the ignition operation is to take place.

3. An apparatus for controlling ignition timing of an internal combustion engine which is adapted to control time at which an ignition device for the internal combustion engine is fed with an ignition signal to control ignition timing of the internal combustion engine, comprising:

a pulse signal generating means for generating a pulse signal every time when the internal combustion engine rotates by a micro angle;

a signal generator for generating a reference signal at a predetermined angular position of rotation of the internal combustion engine;

a first pulse counting means for starting the counting of said pulse signal every time when said reference signal is generated to count a first number N1 of pulse signals;

a first time storing means for storing time T1 at which said first pulse counting means completes the counting of said first number N1 of pulse signals;

a second pulse counting means for starting the counting of said pulse signal at time when the counting of said first number N1 of pulse signals is completed to count a second number N2 of pulse signals;

a second time storing means for storing time T2 when said second pulse counting means completes the counting of said second number N2 of pulse signals;

a third pulse counting means for starting the counting operation at the time T1 when the counting of said first number N1 of pulse signals is completed or thereafter to carry out the counting operation of the pulse signals until the counting of a third number N3 of pulse signals is completed;

an ignition timing calculating means for operating target ignition timing Ti;

an ignition timing measuring time calculating means for calculating ignition timing measuring time equal to a period of time from time T3 at which said third pulse counting means completes the counting operation to the target ignition timing Ti depending upon information on the engine speed obtained on the basis of the difference between the time T2 at which the counting of said second number N2 of pulse signals is completed and the time T1 at which the counting of said first number N1 of pulse signals is completed while said third pulse counting means carries out the counting operation; and an ignition signal feeding means for starting the measuring of said ignition timing measuring time at the time T3 when said third pulse counting means completes the counting operation to feed an ignition device for the internal combustion engine with an ignition signal when the measuring of said ignition timing measuring time is completed.

4. An apparatus as defined in claim 3, wherein said internal combustion engine comprises a multi-cylinder internal combustion engine;

said ignition device includes an ignition signal input terminal for every cylinder;

said signal generator is constructed so as to generate said reference signal for every cylinder and generate a cylinder discriminating signal between the reference signals corresponding to a predetermined two of said cylinders;

a cylinder discriminating means is arranged for judging a reference signal generated next to said cylinder discriminating signal as a reference signal corresponding to each of the predetermined cylinders to discriminate the cylinder in which the ignition operation is to be carried out; and said ignition signal feeding means feeds the ignition signal to the ignition signal input terminal corresponding to the cylinder discriminated by said cylinder discriminating means.

5. An apparatus as defined in claim 4, wherein said internal combustion engine includes an output shaft having a flywheel magneto mounted thereon; and said pulse signal generating means comprises a ring gear made of iron and arranged on the outer periphery of a flywheel of said flywheel magneto and an inductor-type signal generator for inducing the pulse signal due to a variation in magnetic flux caused by said ring gear.

6. An apparatus as defined in claim 5, wherein said signal generator comprises an inductor-type magnetic pole section provided at a part of said flywheel, and a signal generating element including a signal coil wound on a core having a magnetic pole section opposite to said inductor-type magnetic pole section and a magnet for permitting a magnetic flux to flow through said core; and said gear ring being positioned with respect to said flywheel so that the relationship between the phase of said pulse signal and that of said reference signal is rendered constant.

* * * * *